US010515418B1

(12) United States Patent
Lalani

(10) Patent No.: US 10,515,418 B1
(45) Date of Patent: Dec. 24, 2019

(54) METHOD OF SECURELY AND ACCURATELY ADJUDICATING CLAIMS FOR PAYOUT IN A RISK-SHARING POOL

(71) Applicant: BESURANCE CORPORATION, Calgary, Alberta (CA)

(72) Inventor: Karim Lalani, Calgar (CA)

(73) Assignee: Besurance Corporation, Alberta (CA)

( * ) Notice: Subject to any disclaimer, the term of this patent is extended or adjusted under 35 U.S.C. 154(b) by 209 days.

(21) Appl. No.: 15/281,828

(22) Filed: Sep. 30, 2016

(51) Int. Cl.
*G06Q 40/08* (2012.01)
*G06Q 50/18* (2012.01)
G06Q 50/00 (2012.01)
G06Q 30/02 (2012.01)

(52) U.S. Cl.
CPC ............ *G06Q 40/08* (2013.01); *G06Q 30/02* (2013.01); *G06Q 50/01* (2013.01); *G06Q 50/18* (2013.01); *G06Q 2230/00* (2013.01)

(58) Field of Classification Search
CPC ...................................................... G06Q 40/08
See application file for complete search history.

(56) References Cited

U.S. PATENT DOCUMENTS

| 8,190,454 | B2 | 5/2012 | Chien et al. | |
|---|---|---|---|---|
| 8,200,663 | B2* | 6/2012 | Jones | G06F 17/30648 |
| | | | | 705/12 |
| 2003/0233274 | A1* | 12/2003 | Urken | G06Q 30/02 |
| | | | | 705/12 |
| 2004/0138900 | A1* | 7/2004 | Read | G06Q 30/02 |
| | | | | 705/309 |
| 2004/0249665 | A1* | 12/2004 | David | G06Q 10/10 |
| | | | | 705/2 |
| 2006/0218019 | A1 | 9/2006 | Reis | |
| 2007/0239361 | A1* | 10/2007 | Hathaway | G06F 17/18 |
| | | | | 702/19 |
| 2010/0145734 | A1* | 6/2010 | Becerra | G06Q 10/087 |
| | | | | 705/4 |
| 2011/0047008 | A1* | 2/2011 | Rule | G06Q 10/107 |
| | | | | 705/7.39 |
| 2012/0290329 | A1 | 11/2012 | Ross | |
| 2013/0041695 | A1 | 2/2013 | Hoffman | |
| 2014/0012604 | A1* | 1/2014 | Allen, Jr. | G06Q 40/08 |
| | | | | 705/4 |

(Continued)

FOREIGN PATENT DOCUMENTS

| EP | 2410483 | * | 1/2012 | ............ G06Q 40/00 |
|---|---|---|---|---|
| EP | 2410483 | A1 | 1/2012 | |

OTHER PUBLICATIONS

InsPeer: The first french p2p insurance platform, Jul. 15, 2015, Blue-Dun (Year: 2015).*

(Continued)

*Primary Examiner* — Kito R Robinson
*Assistant Examiner* — Abdulmajeed Aziz
(74) *Attorney, Agent, or Firm* — JRG Attorneys at Law

(57) ABSTRACT

A method for securely and accurately adjudicating a claim for payout in a risk-sharing pool. The method includes receiving a request for a claim payout from a claimant member participating in a risk-sharing pool along with information regarding the claim. Members of the risk-sharing pool serving as jurors analyze the information and vote to validate or reject the claim. A predetermined number of votes are randomly selected and tallied to determine if the claimant is successful in the request for a claim payout.

15 Claims, 6 Drawing Sheets

(56) References Cited

U.S. PATENT DOCUMENTS

2014/0046736 A1  2/2014  Sanders
2014/0162241 A1* 6/2014  Morgia .................. G06Q 30/02
                                                434/362
2015/0331997 A1* 11/2015 Joao ..................... G06F 19/322
                                                705/3

OTHER PUBLICATIONS

Miller, Taryn, Risk Genius Blog, Insights into our World of Insurance & Technology; Besurance vs. Lemonade: The P2P Insurance Battle, May 21, 2016.
Sapona, Ingrid; Peer-to-Peer Insurance Models: Sharing Economy Adds (New) Tech Twist to (old) Risk Pooling, Jun. 2016.

* cited by examiner

METHOD OF SECURELY AND ACCURATELY ADJUDICATING CLAIMS FOR PAYOUT IN A RISK-SHARING POOL

TECHNICAL FIELD

The present invention relates generally to risk-sharing pools. More particularly, the present invention relates to the validation of claims in risk-sharing pools.

BACKGROUND OF THE INVENTION

Today's economy has seen the bloom of the so called sharing-economy. Under traditional business models, businesses with large capital are able to bear the costs and infrastructure of providing services to consumers. Under the share-economy theory, individual consumers pool their resources and knowledge to provide similar services.

One industry that the share-economy has recently encroached upon is the loss mitigation and insurance industry. Under traditional insurance models, an individual wishing to protect himself from the risk of loss may pay a monthly premium to a high capital backed insurance company. If the individual experiences a covered loss during his coverage period, his insurance provider will cover all or a portion of his losses.

Under a share-economy risk pool, individual members seek to insure each other. Individuals in a pool will deposit funds into the pool, and if any member of the risk-sharing pool experiences a loss, the members will use the pool funds to cover the member's expenses. Members may find the risk-sharing pool attractive, as in many cases, risk pools can reduce costs by forgoing business overhead and staffing costs associated with a traditional insurance company.

Utilizing modern social networking and the wide spread access afforded by the internet, share-economy companies seek to provide risk coverage to a wide range of individuals that may otherwise not have traditional insurance coverage. Due to the flexibility of a shared-risk pool, members can insure losses for virtually any risk, granted there are enough members interested to insure the loss. Risk-sharing pools can now utilize the internet to expand their reach to increase the number of potential members globally, and members are no longer restricted to geographic communities.

In both the share-economy and traditional insurance realm, the costs associated with a loss can far exceed an individual's monthly premium or pool contribution. This creates an incentive for fraud and abuse. Under the traditional insurance model if a consumer experiences a loss, the individual will file a claim with his insurance company. A traditional insurance provider may then employ the services or a loss adjustor or loss assessor to determine the price and validity of the consumer's claims.

Under a true risk-pooling model, members can cut pool costs by not employing loss assessors. Additionally, by utilizing social media networks and the internet, risk sharing pools are able to connect members globally, making the hiring of trusted loss assessors prohibitively costly. For example, if individuals from around the globe form a risk-sharing pool, and a geographically isolated member files a claim with the pool, pool members may have to rely solely on the claimant or on an assessor of the claimant's choosing to determine the value of the claimed loss. This situation can lead to a perceived conflict of interest if not an actual conflict, and can cause members to become hesitant or lose confidence in the risk-sharing pool. In the share-economy industry, a member's confidence in the platform is paramount.

This application incorporates by reference U.S. patent application Ser. No. 15/122,611 ('611) filed Aug. 30, 2016, as if fully set forth herein. Patent Application '611 discloses a computer implemented method of creating peer-to-peer risk sharing pools. '611 discloses gathering members with like insurance needs and creating a risk-sharing pool in which the members each contribute funds to the pool to be used by members to recover from covered losses.

In light of the shortcomings in the prior art, there clearly exists a need for an improved method of adjudicating loss claims in a risk-sharing pool that minimizes fraud and increases the accuracy and efficiency of the pool.

SUMMARY OF THE INVENTION

The present invention is a new method of securely and accurately adjudicating claims for recovery in a risk-sharing pool.

It is an additional feature of the present invention to randomly select members to serve as adjudicators in order to prevent prearranged collusion between members and claimants.

It is a further feature of the present invention to utilize wisdom of the crowd decision making to poll many knowledgeable members in the decision making process, and thereby maximizing the accuracy of the adjudication.

It is feature of the present invention to randomize which juror's votes become deciding to prevent jurors from abusing their position.

It is a feature of the present invention to provide a claim and voting record so that members of a risk-sharing pool may self-moderate and evolve their pool to their own particular needs.

It is a further feature of the current invention to provide a claims adjudication process for risk-sharing pools in a transparent and accessible manner to the members of the risk-sharing pool, while also maintaining the integrity of the adjudication process.

It is an additional feature of the current invention to provide a means to verify accuracy of a claims adjudication in a risk-sharing pool It is a further feature of the current invention to provide a method for choosing the most effective jurors for adjudicating a claim in a risk-sharing pool.

It is a further feature of the current invention to provide a system for securely and accurately adjudicating claims for recovery in a risk-sharing pool.

Consequently, for a better understanding of the present invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

Figure 1:
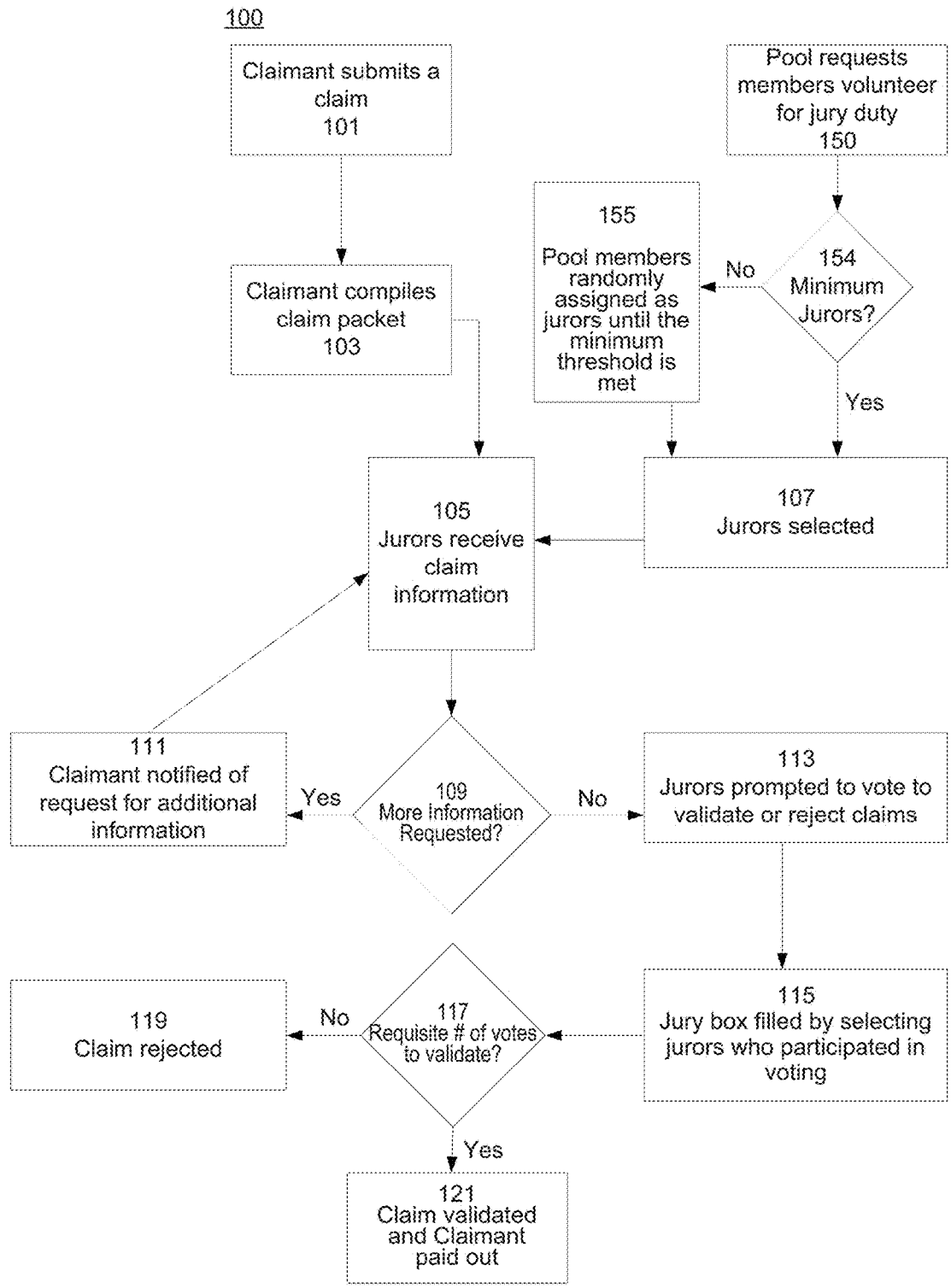
FIG. 1 is a flow chart diagram illustrating an exemplary implementation of the method of adjudicating a claim for a payout from a member of a risk-sharing pool.

Turning to FIG. 1, the present invention is a method of securely and accurately adjudicating claims for recovery in a risk-sharing pool. The method 100 includes receiving a request 101 from a claimant with any claim information 103 the claimant wishes to provide. Meanwhile, the system creates a jury pool by selecting jurors 107. The claim information is collated into a claim packet and forwarded 105 to the jury pool. Jury pool members consider the information and determine whether or not to validate 113 the claimant's claim. The system then randomly selects 115 a predetermined number of members from the jury pool to form a virtual jury box. The votes of the members of the jury box are then counted 117, and a determination of whether the claimant's claim is validated or denied 119 is made. If the claimant's claim is validated, the claimant is paid out 121 from the risk-sharing pool funds. In an embodiment, the claimed method may be carried out on a computer coupled to a social networking platform.

In an embodiment, the system creates a jury pool 107. A pool administrator may decide that a jury pool must contain a minimum number of members. This minimum number of jury pool members may be based on the total number of members in the risk-sharing pool. A jury pool size should be sufficiently large to properly and accurately represent the pool. For example, a pool administrator may determine that a jury pool should be sized to include at least 25% of the members of the whole risk-sharing pool; if a pool contained 1000 members, therefore the resulting jury pool would require at least 250 members. The pool administrator may decide to keep jury pool members' identities anonymous.

In an embodiment, a pool administrator may poll risk-sharing pool members to determine if any members wish to volunteer 150 to serve on the jury pool. Volunteers for the jury pool may be chosen to serve as permanent members. If the pool does not have enough volunteers to meet the minimum jury pool size 154, the system may randomly select 155 members of the risk-sharing pool to serve as jurors in the jury pool. Under the present invention, the system may construct the jury pool 107 before or after a claimant has filed a claim 101. It may be advantageous for a pool administrator to create the jury pool prior to the filing of a claim, even as early as the creation of the risk-sharing pool. In this way, the user can minimize the risk of member volunteering for jury duty to unduly influence the adjudication process on behalf of a particular claimant. Under an additional embodiment, a user may ask for volunteer 150 jurors prior to receiving any claims 101, and upon receiving a claim, the user can fill the remaining spots in the jury pool, if any, with random members of the risk-sharing pool 155.

Figure 2:
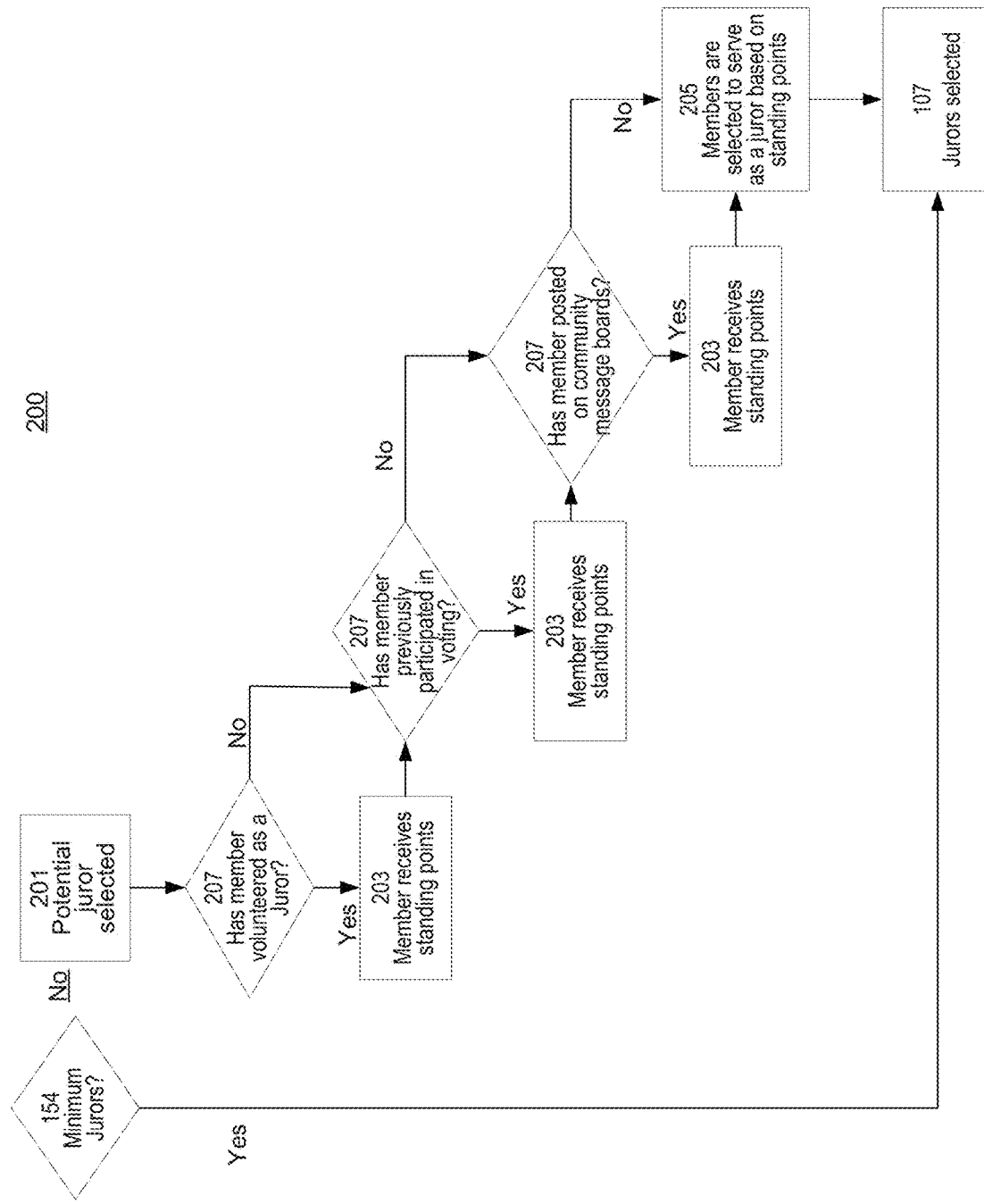
FIG. 2 is a flow chart diagram illustrating an exemplary implementation of a method of determining which pool members should serve in a jury pool.

Turning now also to FIG. 2, the present invention includes a method 200 for selecting jurors to maximize participation in the adjudication process. According to the method, if the pool does not have enough volunteers to meet the minimum jury pool size 154, the pool will look to draft pool members to serve as jurors. When a risk-sharing pool determines that a jury pool will need to be chosen, the pool or pool administrator can create or analyze a previously created juror profile for each member of the risk-sharing pool. In creating the juror profile, the pool administrator can look through previous member activity, and determine if the member should be selected for the jury pool.

In an embodiment, a pool administrator may decide that a jury pool should contain very active members of the risk-sharing pool community. A pool administrator can determine which past member actions 207 would indicate that a member would serve as an active juror. The pool administrator can assign these action with a point value, based on the action's strength as an indicator, and if the member's history shows that the member had performed these action, the pool administrator can award "points" 203 to the member. For example, a pool administrator may look to see if potential jurors had previously volunteered as a juror, or if the member had served in a jury pool before and if the member had participated in the voting process at that time. The pool administrator may also look to factors outside of the adjudication process to determine if a member would serve as an active juror, such as if a member frequently contributes to any risk-sharing pool community message boards. In an embodiment, a risk-sharing pool platform contains a social networking aspect for members to find other similarly interested members to join risk-sharing pools with. A platform or pool administrator may look to social aspects of a member's performance to determine if they should be assigned to a jury.

When a juror needs to be randomly selected the pool administrator may choose the member with the highest "point" value assigned to them. A pool administrator may also choose to randomly assign members to serve on the jury with members with higher "point" values having a higher probability to be randomly chosen. Alternatively, a pool administrator may apply this method to increase member participation by favoring members with low "point" values.

This method may be applied to a platform containing multiple risk-sharing pools, wherein the platform administrator may look to a member's action in other pools or a member's actions on the platform to determine if the member should be selected for a jury pool on a particular risk-sharing pool.

Turning back now to FIG. 1, when a member of a risk-sharing pool experiences a loss intended to be covered by the risk-sharing pool, the member is directed to file a claim 101 with the pool. While filing the request for the claim payout, the member is advised to submit any documentation or information regarding their claim and damages. The claimant may compile this claim packet 103, and the claim packet is forwarded to the jury pool 105. Jury pool members may receive information in a claim packet 103, regardless of whether or not a claimant decides to compile any information. For example, a claimant may decide to not send any information regarding their claim, and the jury pool member may still receive the identity and geographic location of the claimant, at the discretion of the pool administrator.

Once the jury pool has received the claim packet, they are advised to review the claim packet and decide whether or not to validate the request for claim payout 113. Jury pool members are also advised that they can request further information from the claimant 109. Any request for further information is forwarded to the claimant 111. The claimant may or may not honor the request at their discretion, and the adjudication process will proceed. Any additional information collected by the claimant is sent to the jury pool 105. A pool administrator can then close voting. The pool administrator may decide to keep voting open until all or a predetermined portion jury pool members have voted. The administrator may also decide to close voting after a predetermined period of time has elapsed.

In an embodiment, all jurors are given three expressed options: (1) to validate the claim, (2) deny the claim, or (3) to request more information. A juror may also abstain from the process. A pool administrator may make the entire claim packet available to all jurors, but restrict access to the claims packet to jurors once they have decided to validate or deny the claim. A jury pool member who selected to request additional information may retain access to the claim packet and be given additional time to validate or deny the claim. Additionally, a pool administrator may decide to restrict access to the claims packet to jurors once they have decided to validate or deny the claim, but reopen access if the claimant has submitted additional information. In this scenario, a pool administrator may decide that a juror may change their vote if more information is submitted or a juror may change their vote anytime until the close of voting.

In order to determine the outcome of the adjudication, a jury box is formed 115. A jury box comprises a predetermined number of jury pool members. A user of the present invention may form the jury box 115 before or after prompting jury pool members to vote 113. In an embodiment in which a juror may abstain from voting, or in which the period for voting may close before all jury pool members vote, the user may form the jury box 115 only from jury pool members who participated in voting. In an embodiment, members of the jury pool are randomly selected to serve in the jury box. In a further embodiment, a jury box can only contain an odd number of members so as to eliminate the possibility of ties. Jury pool members selected to the jury box have their votes then tallied, and if the number of votes to validate a claim exceeds a predetermined amount or proportion of the jury box votes 117, the claim is validated and the claimant is awarded the claim payout 121. The predetermined amount of votes required to validate a claim can be a majority percentage. A jury box should be randomly created anew for each claim request. Regardless of which jurors are selected to serve on the jury box, all members of the jury pool are allowed to vote whether to validate or deny the claimant's claim.

This second screening of jury members serves to secure and refine the adjudication process. A large jury pool is created 107 to allow many members of the pool to participate in the analysis of the claim packet. With this increased number, the likelihood that a member will request information that substantially improves the accuracy of the adjudication process increases. Additionally, by screening out members of the jury pool in forming the jury box 115, the invention creates a double-blind, and neither members of the jury pool nor the claimant is aware of whether or not a particular juror's vote will be assessed in the determination of whether the claim is validated or not 117. If a jury pool member is unaware that their vote will be counted in deciding the outcome of the claim validation, the probability that the jury pool member can abuse his position as adjudicator is minimized. Additionally, because a claimant is unaware as to which jury pool members will be selected to the jury box, the claimant is less likely to try to unduly influence jury pool members. Further, under the present invention, a group of individuals participating in a risk-sharing pool are inhibited from colluding or attempting to defraud the pool. Any such group will have only limited success as there is no guarantee that members of the group will serve in the jury box for any given claim.

Figure 3:
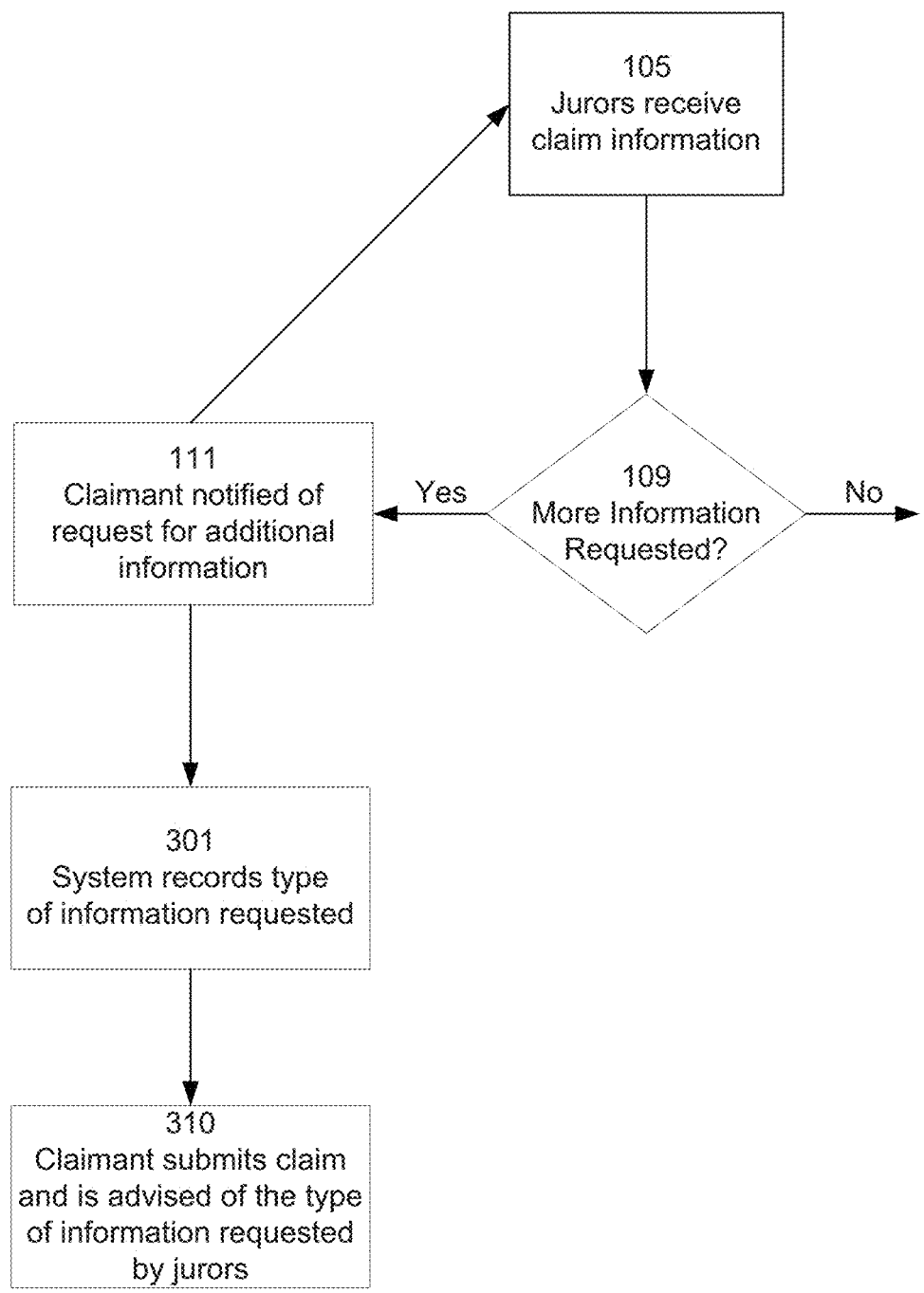
FIG. 3 is a flow chart diagram illustrating an embodiment of the claimed method adapting over successive iterations.
Figure 4:
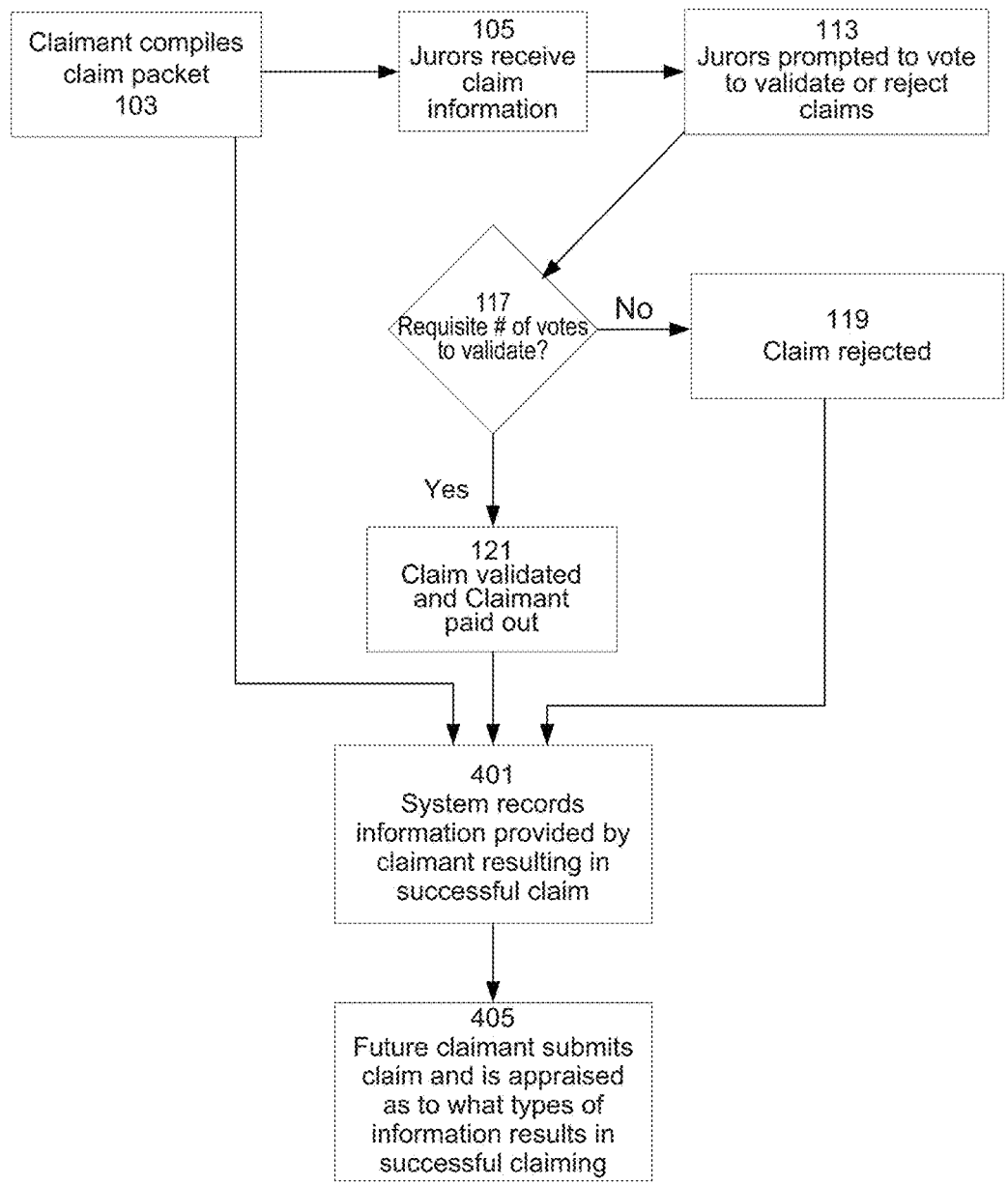
FIG. 4 is a flow chart diagram illustrating a further embodiment of the claimed method adapting over successive iterations.

Turning now also to FIGS. 3 and 4, the present method is designed to be hands off by the user and adjustable based on the needs and preferences of the risk-sharing pool. In an embodiment, the system can be applied many times over the course of risk-sharing pool's coverage period. In a first iteration of the method, a user may determine which facts and documents are most necessary to the accurate adjudication of a claim. When a claimant files a claim, the method, based on the pool administrator's determination, may instruct the claimant to provide information 105 pertinent to the facts and documents deemed necessary by the administrator. As adjudication proceeds, jury pool members may request additional 109 specific facts or types of documentation, and the claimant is notified of the request 111. Under an embodiment, the system may store and record 301 the types of information requested by jurors, and if certain types of information are found to be commonly requested, in further iterations of the adjudication process, a claimant is instructed to provide these types of information or documents 310 in the construction of the claim packets.

It is a feature of the risk-sharing pool model to insure against a variety of types of losses. In more peculiar types of losses, a pool administrator may be unaware of the best type of information needed to accurately adjudicate a claim. In this way, the claimed method relies heavily on the input of the pool members, members who presumably are more knowledgeable on the subject matter of the risk pool.

In an additional embodiment, when a claimant files a claim, the method, based on the administrator's determination, advises the claimant to provide information pertinent to the facts and documents deemed necessary by the user. The user may compile the claim 103 packet with whatever information the claimant deems pertinent as adjudication proceeds, jury pool members may request additional specific facts or types of documentation. Once adjudication is completed, the types of information provided by the claimant and considered by the jury is recorded 401 along with whether the claimant was successful in validating their claim for payout. Upon a successive iteration of adjudication, a claimant is instructed to provide these types of documents or information 405 in the construction of the claim packets, and that this type of information has been found helpful in validating a claim for payout.

Figure 5:
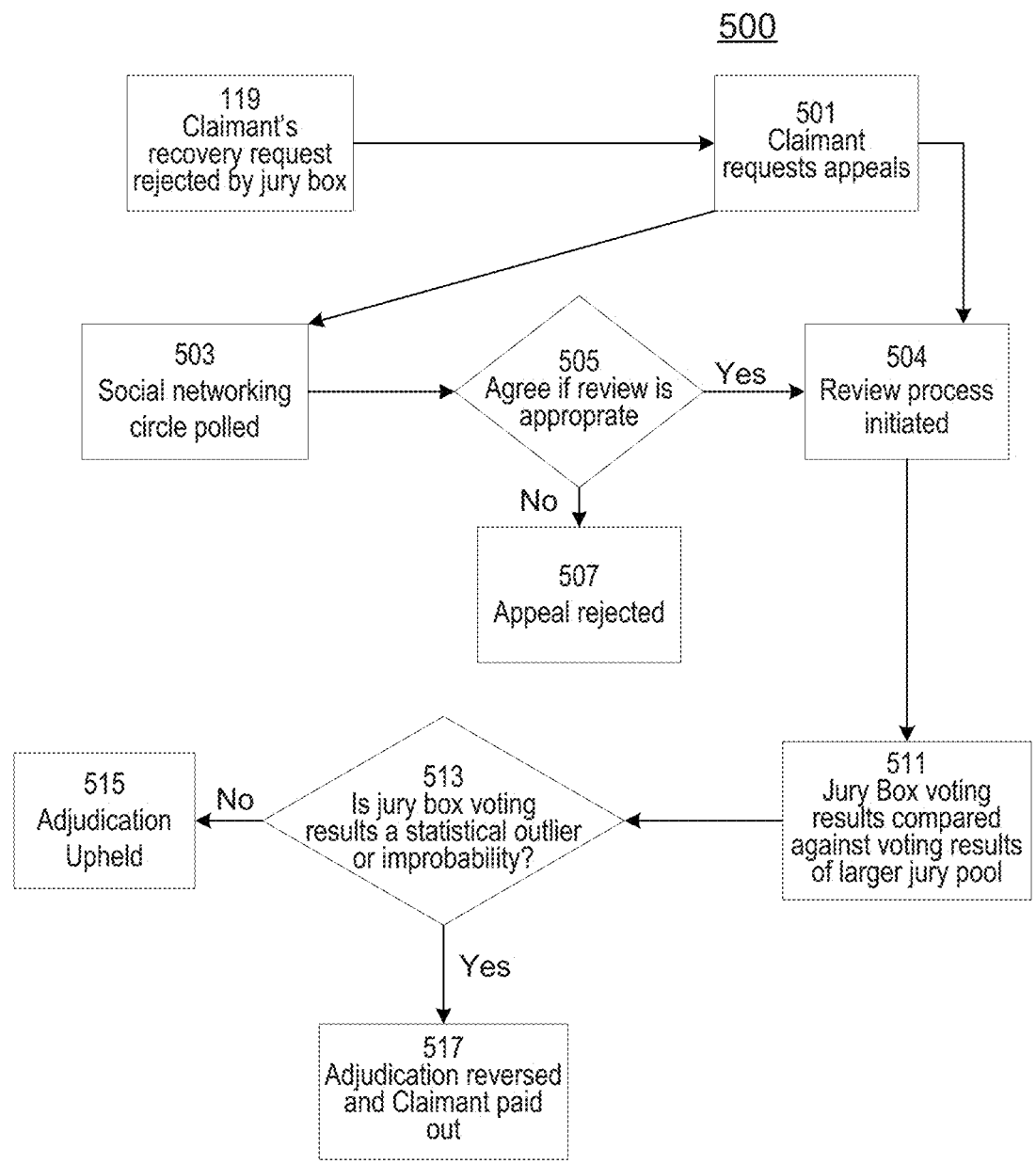
FIG. 5 is a flow chart diagram illustrating a method of verifying the results of adjudication

Turning now to FIG. 5, the present invention further includes a method to affirm a jury box decision. A feature of the present invention is to base adjudication decisions on the votes of a portion of the jury pool. Because the whole voting body is not accounted for, under the present invention, adjudication can yield results that grossly misrepresent the views of the jury pool and the risk-sharing pool as a whole. In an embodiment, if an adjudication yields an unexpected result, a member of the risk-sharing pool, such as the claimant can request an appeal 501. If an appeals process is initiated 504, then the pool administrator may compare 511 the jury box voting results with the voting distribution of the larger jury pool. If the pool administrator decides that the results of the adjudication represents a statistical improbability 513, then the pool administrator can reverse 517 the adjudication results. For example, a pool administrator can simply check to see that if the whole jury pool was polled, would the results be the same.

However, a feature of the present invention is to hold the decision making power with the jury box. In order to favor a jury box decision, the pool administrator may choose to employ an intermediary step to determine if an appeal is warranted. In an embodiment, a pool administrator may take a quick poll of risk-pool members to decide if a majority of members believe than an appeal is warranted. In an embodiment, a risk-sharing pool may be associated with a social networking platform. In such an embodiment, a pool administrator may poll members of the social networking platform 503 to determine if an appeal is warranted. Polling may be a simple vote. The pool administrator may make available to the members of the social networking platform who are being polled with all or a portion of the claim packet. The pool administrator may also withhold information the administrator deems sensitive from the claim packet.

A pool administrator however can use more complex methods to determine the validity of the jury box vote while still favoring the resolution of the jury box. Pool administrators can implement nonparametric statistical hypothesis tests to determine the validity of the jury box. Examples of such tests are binomial tests, chi-squared goodness of fit tests, a Fisher's exact test, a proportions test, or a McNemar's test. In utilizing such tests, pool administrators can set a desired significance level to represent the amount of tolerance is acceptable. The pool administrators may then compare the jury box distribution and the jury pool distribution and determine if the jury box results fall within the desired significant level, or tolerance. A pool administrator may decide that if the jury pool distribution differs from the jury box resolution, to accept the jury pool distribution only if the jury box resolution falls outside of the tolerance.

A pool administrator may additionally verify the jury box decision by selecting a new jury box out of the existing jury pool member votes. Further, a pool administrator may favor the original jury box decision by repeatedly reselecting jury boxes and accepting or rejecting the original jury box decision if a certain percentage of the repeated jury boxes come to the same conclusion.

A pool administrator may decide to combine this method with the previously mentioned screening method. A pool administrator may also decide to not apply the appeals procedure in specific scenarios, such as not allowing appeals for jury box decisions to pay out the claimant.

Figure 6:
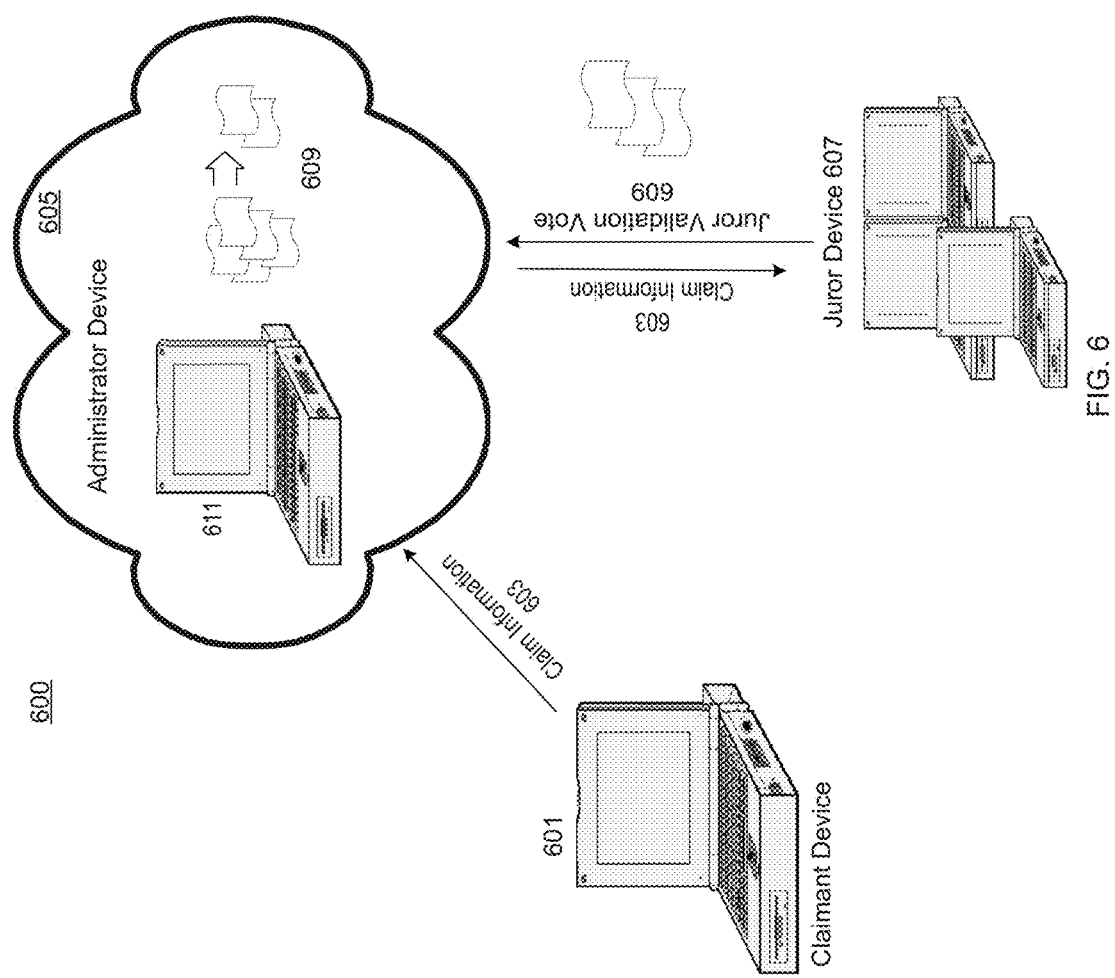
FIG. 6 is a block diagram illustrating an exemplary system of adjudicating a claim for a payout from a member of a risk-sharing pool.

Turning now also to FIG. 6, the present invention includes a system 600 for adjudicating a claim for a payout from a member of a risk-sharing pool. The system comprises a claimant device 601, at least one juror device 607 and an administrator device 611. The devices are coupled to a network 605, such as the internet, and comprise non-transitory computer readable media. A claim packet 603 is compiled on a claimant device 601, and transmitted via the network 605 to the administrator device 611. The administrator device logs this information for later reference and forwards the information to the member devices 607. Jurors then analyze the claim information 603 on the juror devices 607. Jurors decide whether to validate, deny or abstain, and send these juror validation votes 609 via the network 605 to the administrator device 611. The administrator device then logs the juror validation votes 609, and randomly selects a predetermined number of votes. The administrator device 611 tallies the predetermined number of votes and validates or denies the claim.

Example

The following is an illustrative example of a method of securely and accurately adjudicating claims for recovery in a risk-sharing pool. The example is provided for illustrative purposes only and should not be taken in any limiting sense since the scope of the invention is best defined by the appended claims. In this example, an online community of 100 geographically diverse ski and snowboard enthusiast form a risk-sharing pool to cover costs related to ski or snowboarding accidents. The group decides that a jury pool should consist of at least 50 members, and a jury box should consist of 11 jurors. 15 members of the group volunteer to serve as permanent jurors, and an additional 35 members are randomly selected to serve as jurors as well.

A member of the group suffers an injury and files a claim for payout and the adjudication system of the pool asks that the claimant provide the estimated costs of his injuries and a brief description of the incident. The claimant collects this information and it is forwarded to the jurors. A juror may read the description of the injury and decides that it is sufficient and adequately reflects that the claimant is due a payout. Another juror however may feel that the description is insufficient and requests that the claimant provide a map of the mountain the claimant was on and an outline of the path the claimant was taking.

In this example, the claimant is notified of this and provides the requested information. From this information, jurors can note that the claimant may have been on a particularly difficult mountain or that the claimant had strayed far from the designated path. Some jurors may decide that the claimant was being reckless and thus is not due a payout.

The pool administrator closes voting after 90 days of the claim filing. Of the 50 jury pool members, 30 had voted at the time of close. 11 of those 30 votes are randomly selected and tallied. If a majority of the votes validate the claim the claimant is paid out.

The pool administrator notes that jurors asked for and found helpful a map of the mountain the claimant was on and the path the claimant was taking at the time of the incident, and in any further claims for payout in this particular pool, the claimant is advised to include a map of the mountain the claimant was on and the path the claimant was taking at the time of the incident.

What is claimed is:

1. A method of validating and accurately adjudicating claims for payout in a community-based risk-sharing pool, the method comprising the steps of:

forming the risk-sharing pool community by communicatively coupling a plurality of members via social media networks, each member communicatively coupled to at least a mobile device, the social media networks being communicatively coupled to a web portal and configured to allow the members to locate similarly interested members without any geographical constraint to join the risk-sharing pool, and a pool administrator device communicatively coupled to the web portal having a database of member group records, a database of member records, and a payment module linking each member's funds account from source accounts held at financial institutions to the web portal;

defining attributes of the risk-sharing pool having: a member enrollment fee, a minimum number of participants, a term of the event risk-sharing pool, a minimum requirement to be a member in the event risk-sharing pool, and a claim benefit account with a required minimum balance, each member having a separate funds account in the payment module;

funding the claim benefit account associated with the risk-sharing pool from each respective member's funds account using the payment module;

locking the claim benefit account on the web portal where member participants cannot withdraw from the risk-sharing pool until the term has ended and where member participants are unable to access said funds from the source accounts linked to the web portal;

receiving a claim request for a claim payout from a claimant participating in the risk-sharing pool, said claimant being a member of the risk-sharing pool and having experienced a loss;

receiving information from the claimant corresponding with the claim;

selecting jurors, via the pool administrator device, to form a jury pool from the members of the risk-sharing pool for adjudicating the claim made by said claimant;

the pool administrator device having a processing unit and being communicatively coupled to the risk-sharing pool community, wherein the pool administrator device having system memory, the system memory including instructions that when executed by the processing unit performs operations comprising:

determining the size of the jury pool based on a predetermined percentage of the members of the risk-sharing pool;

recording a member's social participation on at least one of the social media networks for determining who becomes a juror;

awarding the member with points based on the member's social participation in the risk-sharing community;

increasing or decreasing the probability that the member will be randomly chosen to serve on the risk-sharing pool's jury based on the number of points that the member has accumulated, wherein a member with more points having a greater probability of being selected to the jury pool;

prompting the jurors to vote to either validate or deny the requested claim;

selecting at random a predetermined number of the jurors who participated in voting to fill a jury box, wherein the random selection of the predetermined number of jurors to fill the jury box is performed anonymously, such that neither the jurors nor the claimant is aware of the identity of the jury box, thereby enabling the risk-sharing platform community to avoid collusion or fraud when the jurors are selected;

responsive to the predetermined portion of the jury box jurors having voted to validate the claim;

paying out recovery to the claimant;

receiving a request to appeal the decision to pay out or not pay out the claimant from a member of the risk-sharing pool;

comparing the voting results from the jury box to the voting results of the jury pool;

responsive to a determination that the results of the jury box represent a statistical improbability compared to results of the jury pool, overturning the decision to pay out or not pay out the claimant; and selecting a desired significance level, and wherein the determination if the results represent a statistical improbability comprises performing a null hypothesis test to determine if a difference between the results of the jury box and the results of the jury pool is statistically significant given the desired significance level.

2. The method of claim 1, further comprising prompting members to volunteer as juror's prior to selecting jurors.

3. The method of claim 1, wherein the step of selecting jurors further comprises selecting the jury pool to contain a minimum number of jurors.

4. The method of claim 3, wherein the minimum number of jurors is based on the number of total members in the risk-sharing pool.

5. The method of claim 1, further comprising receiving and forwarding to the claimant a request for additional information from a jury, and responsive to receiving additional information from a claimant, forwarding the additional information to the jurors.

6. The method of claim 1, wherein if the number of jurors participating in voting does not meet the predetermined number of jurors to fill the jury box, randomly selecting a predetermined portion of participating jurors to fill the jury box.

7. The method of claim 6, wherein the predetermined portion of participating jurors to fill the jury box is the highest odd number of participating jurors.

8. The method of claim 1, wherein the type and quantity of information received from the claimant is recorded in conjunction with whether or not a claimant was successful in validating the claim.

9. The method of claim 5, wherein the type and quantity of additional information requested by a juror is recorded.

10. The method of claim 9, wherein the claimant is directed to send information of the type and quantity as those recorded as being requested by jurors.

11. The method of claim 1, wherein the said null hypothesis test is performed using a nonparametric statistical test.

12. The method of claim 11, wherein the nonparametric statistical test is selected from the group comprising: a binomial test, chi-squared test, a Fisher's exact test, a proportions test, and a McNemar's test.

13. The method of claim 1, further comprising conducting a poll to determine if an appeal is appropriate.

14. The method of claim 13, wherein the member's social participation recorded are selected from a group consisting of: the member's previously serving on a jury, the member's previously participating in voting, the member's participation in pool activities.

15. A computer-implemented system for securely and accurately adjudicating claims for payout in a risk-sharing pool community, the system comprising:

a claimant device communicatively coupled to a web portal comprising non-transitory computer readable media and a processor capable of compiling and transmitting claim information;

at least one juror device, coupled to the web portal comprising non-transitory computer readable media and a processor capable of receiving claim information and conveying said information to a user and transmitting a juror validation vote;

a plurality of social media networks configured to form the risk-sharing pool community by communicatively coupling a plurality of members via the social media networks, wherein the social media networks being communicatively coupled to the web portal and suitably configured to allow the members to locate similarly interested members without any geographic constraint to join the risk-sharing pool community, and a pool administrator device communicatively coupled to the web portal having a database of member group records, a database of member records, and a payment module linking each member's funds account from source accounts held at financial institutions to the web portal;

the pool administrator device communicatively coupled to the web portal comprising non-transitory computer readable media and a processor capable of receiving claim information from a claimant device via the network, wherein the non-transitory computer readable media including instructions that when executed by the processor performs operations comprising:

defining attributes of the risk-sharing pool having: a member enrollment fee, a minimum number of participants, a term of the event risk-sharing pool, a minimum requirement to be a member in the event risk-sharing pool, and a claim benefit account with a required minimum balance, each member having a separate funds account in the payment module;

funding the claim benefit account associated with the risk-sharing pool from each respective member's funds account using the payment module;

locking the claim benefit account on the web portal where member participants cannot withdraw from the risk-sharing pool until the term has ended and where member participants are unable to access said funds from the source accounts linked to the web portal;

forwarding the claim information to the juror device via the web portal;

recording a member's social participation on at least one of the social media networks for determining who becomes a juror;

awarding the member with points based on the member's social participation in the risk-sharing community;

increasing or decreasing the probability that the member will be randomly chosen to serve on the risk-sharing pool's jury based on the number of points that the member has accumulated, wherein a member with more points having a greater probability of being selected to the jury pool;

receiving the juror validation vote;

randomly selecting a predetermined number of juror validation votes to fill a jury box, wherein the random selection of the predetermined number of jurors to fill the jury box is performed anonymously, such that neither the jurors nor the claimant is aware of the identity of the jury box, thereby enabling the risk-sharing platform community to avoid collusion or fraud when jurors are selected;

tallying said predetermined number of juror validation votes;

responding to the predetermined portion of the jury box jurors having voted to validate the claim;

paying out recovery to the claimant;

receiving a request to appeal the decision to pay out or not pay out the claimant from a member of the risk-sharing pool;

comparing the voting results from the jury box to the voting results of the jury pool;

responsive to a determination that the results of the jury box represent a statistical improbability compared to results of the jury pool, overturning the decision to pay out or not pay out the claimant; and selecting a desired significance level, and wherein the determination if the results represent a statistical improbability comprises performing a null hypothesis test to determine if a difference between the results of the jury box and the results of the jury pool is statistically significant given the desired significance level.

* * * * *